Nov. 19, 1957  E. J. SCHLATTER  2,813,339
STEREO ELEVATOR METER
Filed Feb. 23, 1954  4 Sheets-Sheet 1
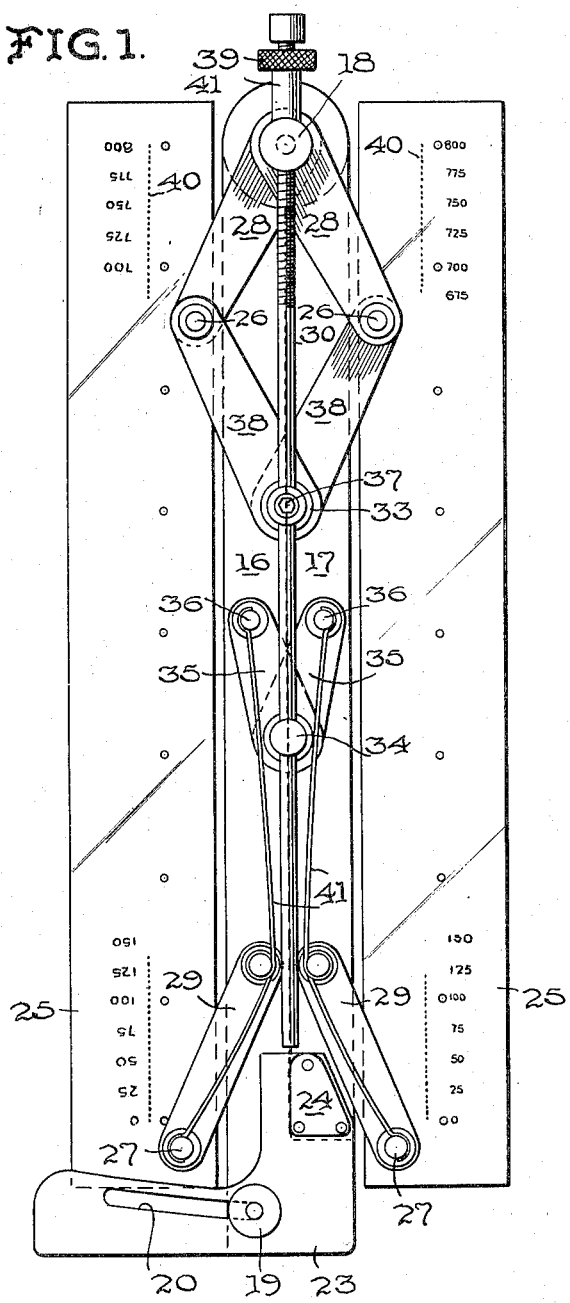
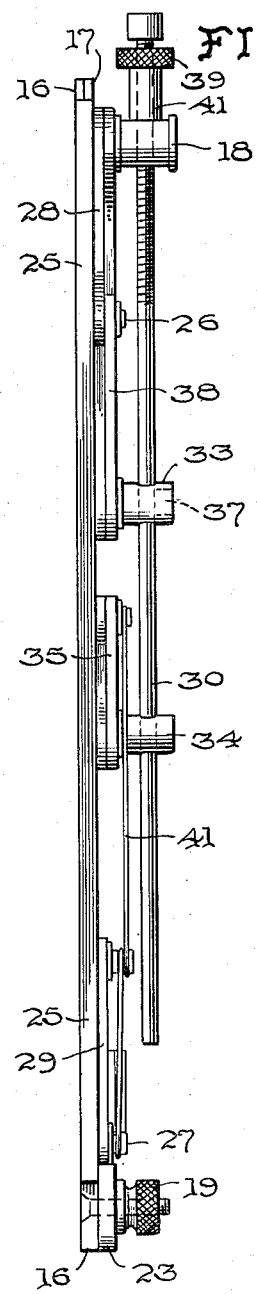
INVENTOR.
EUGENE J. SCHLATTER
BY
Raymond N. Matson
AGENT Nov. 19, 1957  E. J. SCHLATTER  2,813,339
STEREO ELEVATOR METER
Filed Feb. 23, 1954  4 Sheets-Sheet 2
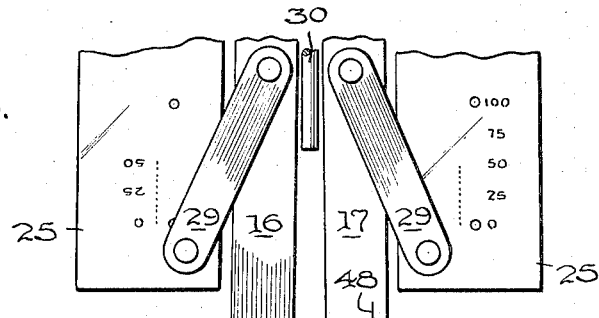
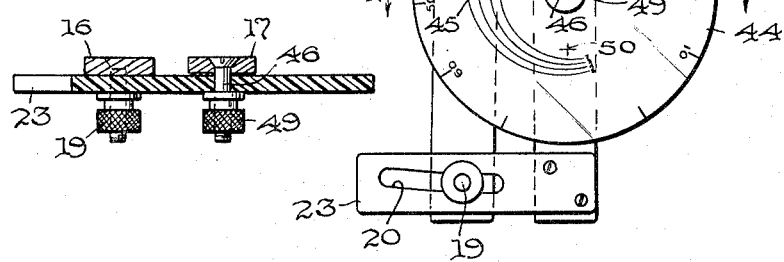
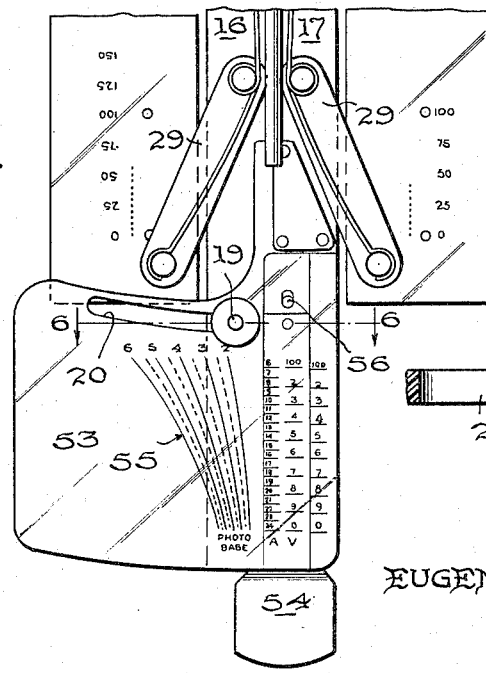
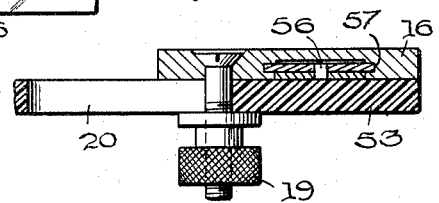
INVENTOR.
EUGENE J. SCHLATTER
BY
Raymond N. Matson
AGENT Nov. 19, 1957     E. J. SCHLATTER     2,813,339
STEREO ELEVATOR METER Filed Feb. 23, 1954     4 Sheets-Sheet 3

INVENTOR.
EUGENE J. SCHLATTER
BY
Raymond N. Matson
AGENT

Nov. 19, 1957  E. J. SCHLATTER  2,813,339
STEREO ELEVATOR METER.
Filed Feb. 23, 1954  4 Sheets-Sheet 4

INVENTOR.
EUGENE J. SCHLATTER
BY
Raymond N. Matson
AGENT

United States Patent Office 2,813,339
Patented Nov. 19, 1957

2,813,339

STEREO ELEVATOR METER

Eugene J. Schlatter, Silver Spring, Md.

Application February 23, 1954, Serial No. 411,890

19 Claims. (Cl. 33—1)

This invention relates generally to apparatus for measuring differences in the elevations of various objects and more particularly to a device for directly determining the elevational difference in terrain on a stereoscopic pair of vertical aerial photographs without necessitating the use of mathematical computations.

In Patent No. 2,428,435 issued to me on October 7, 1947, there is disclosed a device in the nature of transparencies adapted to form a variable elevation wedge and be placed over aerial photographs to be viewed through a stereoscope to directly determine relative differences in elevation between points without resorting to mathematical computation. While this patented device has been highly successful in the use for which it is intended, it has a number of limitations in use that the present invention is designed to overcome.

For example, each pair of the transparencies forming the wedge are limited to one specific flying height of the airplane taking the stereoscopic pictures. The wedge is also limited to measuring an elevational difference of 800 feet and it cannot be readjusted for successive additional increments of 800 feet.

Moreover, in the transparencies forming the patented wedge, there are five possible lateral separations of the rows of target dots, 2.00, 2.25, 2.50, 2.75, and 3.00 forming the eye-base distances. The stereo prints must be mounted in such a way that the "low" ground point in the model (stereo photos) has a separation between the two component images corresponding very closely to one of the five possible separations.

It is most difficult to mount stereo photos or prints in the required alignment while concurrently achieving a given separation. While the transparency supporting frame of the patent would have offset this situation somewhat in a relatively crude, impractical way, it does not provide for various altitude settings nor assure the necessary precise adjustment.

Accordingly, the chief object of the present invention is to provide an improved device of the type described which will obviate the limitations characterizing the variable elevation wedge disclosed by my above mentioned patent.

A further important object of the invention is to provide a stereo elevation meter device of the type described in which the elevation dots and associated target dots of a variable elevation wedge are placed on a pair of pivotally connected legs which may be adjustably connected at their opposite ends, the rows of dots being so mounted and connected to the legs by parallelogram type spreader or retractor devices actuated by a threaded rod control mechanism as to enable the varying of the lateral distance therebetween to accommodate for variations in eye-base and eliminate the necessity for changing the position of the stereo photos.

Another important object of the invention is to provide a device of the type described which includes a scale whereby the wedge angle is automatically adjusted when setting the device for the flying altitude and photo base of the stereo prints upon which the differences in elevation are to be measured.

A further important object is to provide a device of the type described wherein the scale is provided with alignment means permitting it to be calibrated without necessitating its return to the factory.

Another important object of the present invention is to provide a device of the type described which may be used with stereo prints taken at any of a great range of flying elevations and which may be reset to measure successive elevation ranges.

Another important object of the present invention is to provide a precision measuring instrument of the type described which may be readily and economically manufactured, and which will be practical and extremely accurate in use.

Other objects and advantages of the invention will become apparent during the course of the following description.

In its broadest aspects, the device is a practical and accurate means for varying the angle between the two rows of parallax and target dots which indicate the differences in elevation, for varying the lateral distance between the rows while maintaining the angle which may be set from precalculated data or by means of a scale forming a part of the device.

In the drawings I have shown several embodiments of the invention. In these showings:

Figure 1 is a top plan view of one form of the invention showing the arrangement of the elevation dots and the means for varying their spacing laterally and their relative angle;

Figure 2 is a longitudinal, side elevational view thereof;

Figure 3 is a fragmentary top plan view of a preferred embodiment of the invention showing a dial type scale combined therewith;

Figure 4 is a transverse, vertical, sectional view thereof taken on the line 4—4 of Figure 3;

Figure 5 is a fragmentary top plan view of a further embodiment of the invention showing a sliding scale combined therewith;

Figure 6 is a transverse, vertical, sectional view thereof taken on the line 6—6 of Figure 5;

Figure 7:
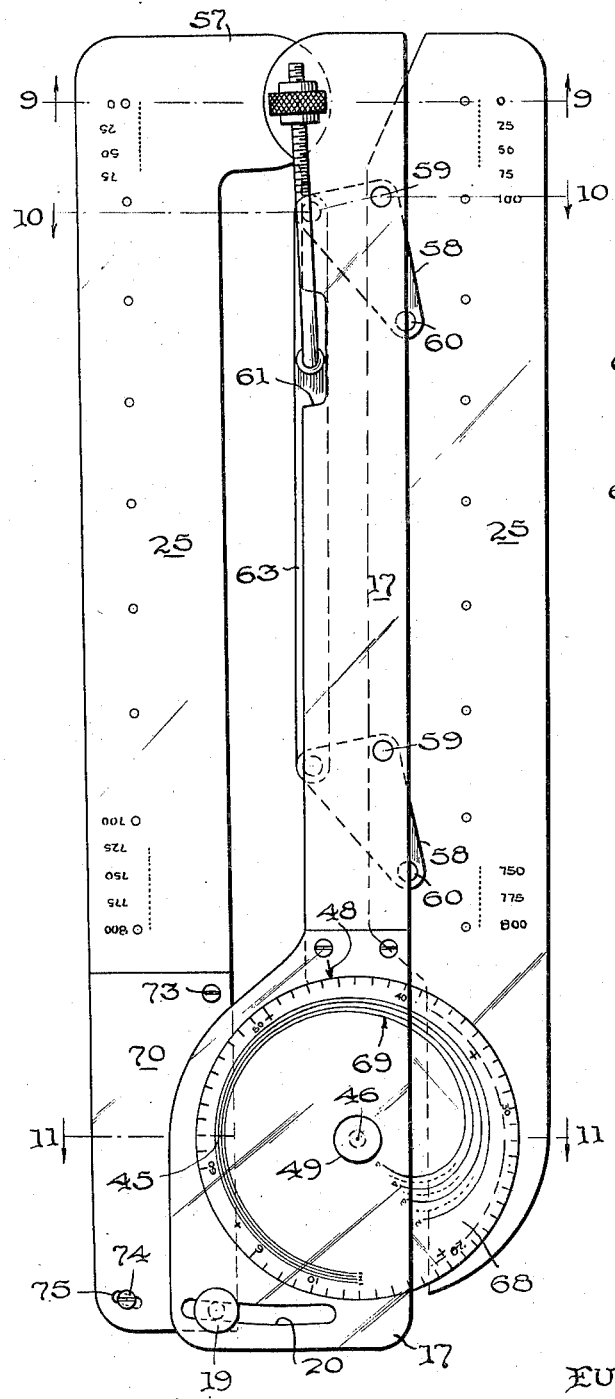
Figure 7 is a top plan view of another form of the invention wherein only one of the rows of target dots is movable to vary the spacing between both rows.
Figure 9:
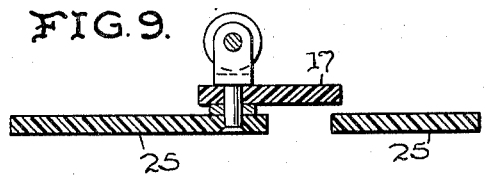
Figure 10:
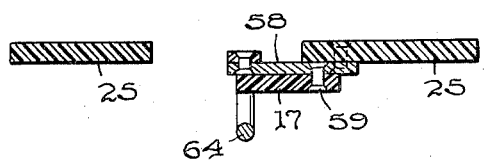
Figure 11:
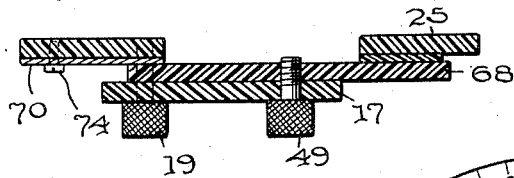
Figure 12:
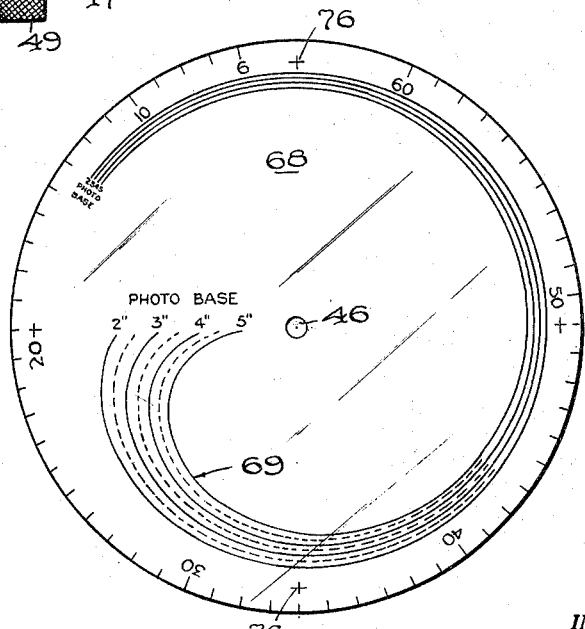

Figures 9–11 inclusive, are transverse vertical sectional views taken on the lines 9—9, 10—10, and 11—11 respectively, of Figure 7;

Figure 12 is an enlarged plan view of the dial type scale of Figure 7; and

Figure 13:
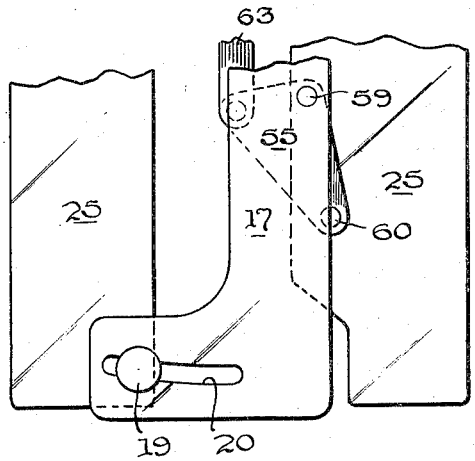

Figure 13 is a fragmentary top plan view of a further form of the invention similar to that shown in Figure 7 but having no scale combined therewith.

Referring to Figures 1 and 2 of the drawings, the meter device comprising the present invention includes a pair of flat leg members 16 and 17 pivotally connected at their normally upper ends by a shouldered stud 18 and adjustably connected at their lower ends by means of a thumb set screw 19 mounted on the leg 16 and movable in a slot 20 of an L-shaped member 23 fixed to the leg 17 by a triangular plate 24.

A transparent plastic, rectangular plate 25 is pivotally attached at 26 and 27 in abutting relationship with the outside edge of each of the legs 16 and 17 to pairs of arms 28 and 29, the plates 25 being of the same thickness as the legs 16 and 17. Movement of the plates 25 outwardly away from the legs is effected by means of an operating shaft 30 passing through aligned bores in the pivot stud 18, an operating stud 33, and a guide stud 34.

The guide stud pivotally connects the lower ends of equal guide arms 35 which are pivoted to the legs 16 and 17 at 36. It will be apparent that the operating shaft 30 will thus always bisect the angle between the legs 16 and 17 passing as it does through the pivot stud 18 and the guide stud 34, through both of which it has an easy sliding fit.

The operating stud 33 is fixed to the operating shaft 30 by a set screw 37 and pivotally connects the lower ends of equal operating links 38 whose upper ends are pivotally connected at 26 to the plates 25. The upper end of the shaft 30 is screw threaded for the reception of an operating thumb nut 39 which acts against the pivot stud 18 through a sleeve 41. The outer end of the shaft is headed to prevent loss of the nut 39.

It will now be apparent that the foregoing structure enables a parallelogram type of action in that the plates 25 may be swung outwardly away from the edges of the legs 16 and 17 while remaining parallel thereto. This is effected by clockwise rotation of the nut 39 which forces the operating stud 33 upwardly to swing the upper ends of the arms 38 outwardly with the plates 25. The lengths and pivots of the arms 29 are so chosen with respect to those of the arms 28 as to insure parallelism of the plates 25 with the legs 16 and 17. When the nut 39 is rotated counterclockwise, the plates 25 are returned to abutting relationship with the legs 16 and 17 by means of strong wire springs 41 whose ends are fastened to the pivots 27 and 36 and an intermediate portion of each is wound about an extension of the upper pivots of the arms 29.

Each of the plates 25 has a row of dots 40 reproduced photographically on its under side numbered from 0 to 800, the distance from the first to the last dot being arbitrarily chosen but the dots should not be spaced closer to each other than .0378 inch. Each dot indicates a difference in elevation with respect to an adjacent dot of 5 feet and the design principles, being fully set forth in my patent, need not be repeated here.

It will thus be appreciated that the form of the invention illustrated in Figures 1 and 2 provides a means of varying the angle between the two rows of dots 40 by loosening the thumb screw 19 and adjusting the angle between the legs 16 and 17 in accordance with precalculated data; and of varying the lateral distance betwen the rows of dots by means of the thumb nut 39, and thus provides a practical and precision device.

In the preferred embodiment of the invention (Figures 3 and 4), the legs 16 and 17 are elongated to enable the rotatable mounting of a dial type scale 44 on the leg 17 at a predetermined distance from the pivot 18. A cross mark 45 is formed on the leg 16 in horizontal alignment with the pivot point and center 46 of the scale 44 and is used in conjunction with the photo base scales 47. An arrow 48 is formed on the surface on the leg 17 adjacent the periphery of the scale 44 and is used for altitude settings thereof. The scale is secured in any set position by the thumb set screw 49 while the thumb screw 19 secures the adjusted position of the cross mark 45 with respect to the photo base scales 47.

As is the case with the plates 25, the dial 44 is of a transparent plastic with the photo base scales and the altitude graduations about its periphery being reproduced photographically on its lower face. To prevent unnecessary wear on these markings, a small washer is preferably inserted between the dial 44 and the leg 17 so as to provide a small clearance therebetween as well as with the leg 16.

The dial scale provides an easy, graphic, readily visible means of accurately setting flight altitudes up to 60,000 feet as the scale about the periphery may be interpolated by eye to 100 foot increments, no vernier being required. The setting of the cross-mark 45 on the photo base scales is even simpler so that the scale as a whole is thus readily adjusted to the conditions in question.

The dial scale may be readily calibrated by using the cross mark 45 and four zero cross marks 50 adjacent the inner periphery of the photo base scales 47. The legs 16 and 17 are set for zero inclination (abutting) so that the rows of dots 40 are exactly parallel. If, as rotated, the zero cross marks 50 exactly coincide with the cross mark 45, the dial is correct. If all four of the zero cross marks 50 do not show the same coincidence with 45, the dial pivot is worn and the stereo elevation meter should be returned to the factory as it should be if none of the marks 50 coincide.

For any given altitude, the principles and mathematics upon which the dial and sliding scales are based are set forth clearly in my above mentioned patent. For example, for the dial scale, parallax values for successive photo bases are calculated, multiplied by a factor derived from the distance between main pivot 18 and disk pivot 46, and plotted as increments from the cross mark 45 toward the pivot 46. For the slide scale the multiplying factor is derived from the distance between main pivot 18 and the particular altitude mark on slide 54, and the resulting parallax values are plotted horizontally from the altitude mark.

The basis equation $$\Delta p = \frac{Bh}{H-h}$$

indicates that $\Delta p$ is a direct function of B but that the relation between $p$ and $$\frac{h}{H-h}$$

is a curvilinear one varying both for different values of $h$ and H. Hence, direct altitude conversion factors based on H alone cannot be used; various values of $h$ within the range if the instrument must also be considered. The relationship being a curve, the problem is in effect to take a section of the curve, superimpose it on another section of the curve, find the fit which has the least critical errors and derive a multiplication factor to $\Delta p$ which will correspond thereto. This is an empirical problem which must be solved by deducing optimum factors for each altitude calculated on a trial and error basis. Critical errors, for an 800 foot range, must be examined at $h$ equals 400 and $h$ equals 800. For a 400 foot range the 200 and 400 foot points are critical.

Since the dots are initially spaced and plotted for 14,125 feet flight altitude the various photo base values are calculated for that value of H. These are than modified by empirical factors to make them fit as closely as possible parallax conditions at other altitudes. By optimum curve fitting, critical errors can be reduced to approximately ¾% from altitudes of 10,000 to 20,000 feet, 1% from 20,000 to 50,000 feet, 1¼% from 50,000 to 60,000 feet—using the full 800 foot range of instrument. Below 10,000 altitude, use of the full 800 foot range would involve excessive critical errors of 5%, hence for flying altitudes of 6,000 to 10,000 feet the range must be reduced to 400 feet and the critical errors become about 1%. Most of the photographs available for civilian use were taken between 10,000 and 20,000 foot flight altitudes with more than three fourths taken at 14,125 flight altitude. Consequently, the invention is based on perfect rigorous mathematics at 14,125 foot flight altitude which concurrently produces the most favorable critical errors for the 10,000 to 20,000 feet altitudes.

The curves for both scales are drawn through a succession of points which are calculated using different photo base and altitude factor combinations. All forms of the invention involve these principles of mathematics. Where scales are not included on the instruments the data is calculated and listed in tabular form. Inclination settings must then be made by using some type of linear measuring device.

The form of the invention disclosed in Figures 5 and 6 is generally similar to that of Figures 3 and 4 but embodies a different form of transparent scale 53 (fixed to the lower end of leg 17) in that the altitude is set by a slide 54 mounted in a slot 57 in an extension of the leg 16 rather than rotating a disk. The scale 53 includes photo base scales 55 and altitude markings A on the slide 54 which is confined in its slot by the transparent plastic scale 53 and limited in its sliding movement as a vernier (see scale V) by a pin 56.

The sliding scale 53 is limited to an altitude range from 6,000 to 24,000 feet with the scale A reading 1,000 foot increments and the scale V, 100 foot increments. A cross mark is associated with each 1000 foot number in the A scale. After slide 54 has been set for the appropriate 100 foot increment by means of vernier V on the top surface of slide 54 by being brought into appropriate coincidence with the counterpart vernier element on the under surface of scale 53 near the right edge, the cross mark on scale A corresponding to the appropriate 1000 foot increment is adjusted to coincide with the proper photo base line 55 by relative movement of the meter legs 16 and 17 upon loosening of the screw 19. The plates 25 are then spread by the nut 39 until the left hand and right hand rows of dots 40 are superposed to the viewer.

Figure 8:
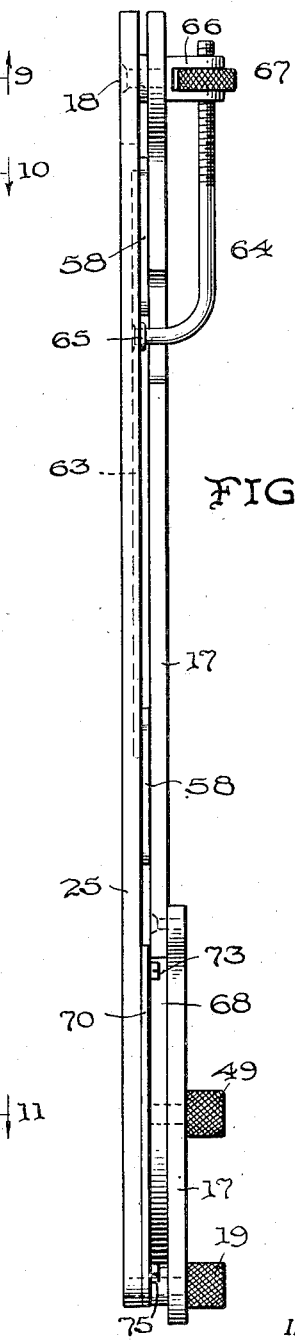
Figure 8 is a longitudinal, side elevational view thereof.

The form of the invention disclosed in Figures 7 and 8 is generally similar to that of Figure 3 and 4 in that a dial scale is used. In this form, however, one of the transparent plastic plates 25 is substituted for the leg 16 and by means of an upper lateral projection 57 is pivoted at 18 to the leg 17, the edges of the plate and leg being thus spaced from each other.

The other or right hand plate 25 is pivotally connected to the leg 17 by means of a pair of spaced bell cranks 58 at 59 and 60 and may thus be moved outwardly from the leg while their adjoining edges remain parallel. The two bell cranks 58 are connected by a bar 63 so that vertical movement thereof will swing the bell cranks 58 about their pivots 59. Movement of the bar 63 in either direction is effected by a rod 64 having connection with the bar at 65, the leg 17 being slotted as at 61 for this purpose. The outer end of the operating rod 64 is screw threaded and passes through an aperture in a yoke 66 mounted on or integral with the pivot 18. An operating nut 67 is confined within the yoke 66 on the rod 64 and it will be apparent that rotation of the operating nut in either direction will cause spreading or retracting of the pivotally mounted right hand plate 25 through the action of the rod 64, the bar 63 and the bell cranks 58.

It will be noted that the spaced arrangement of the plate leg 25 and the leg 17 in this form of the invention effect an inversion of the parallax wedge in which the angle of inclination, or departure from parallelism, between the two rows of dots is decreased by separating the base of the legs rather than closing them. Accordingly, the indicia of the rows of parallax dots 40 are also inverted as are the altitude and photo base scales with respect to the periphery of the dial scale 63 which is shown to enlarged scale in Figure 12.

The cross mark 45 which is positioned with respect to one of the photo base curves 69 during use of the meter, is formed on a plate 70 which is fastened to the upper surface of the plate leg 25 by diagonally spaced screws 73 and 74, the latter being adjustable in a slot 75 for a purpose to be described. The outer periphery of the dial scale 68 is provided with a plurality of angularly spaced zero cross marks 76 which are similar in function to the cross marks 50 of Figure 3 as will be described.

The dial scale 68 as mounted as shown in Figure 7 may not only be calibrated similarly to the manner of dial scale 44 but may also have any noted error corrected by means of the adjustable plate 70 upon which the cross mark 45 appears. This is effected by loosening the thumb screw 19 and setting the inclination of the plate leg 25 and the leg 17 with respect to each other so that the zero dot, the 800 dot, and all intermediate dots rest in the same point on the ground upon which the thumb screw 19 is retightened, the rows of dots 40 now being exactly parallel.

The dial thumb screw 49 is now loosened and each of the four cross marks 76 is tested for exact coincidence with the cross mark 45 on the adjustable plate 70. If coincidence does not occur, the screws 73 and 74 should be loosened and the plate 70 shifted slightly about the screw 73 as a pivot to bring the cross mark 45 into coincidence with the zero cross mark 76 in question. The screws 73 and 74 are then tightened.

It will be readily apparent that coincidence of the mark 45 with any one of the four cross marks 76 should automatically effect a similar coincidence with the other three marks. If all four of the marks 76 do not show the same coincidence upon rotation of the dial 68, it indicates that the pivot 46 is worn and that the dial 68 requires replacing.

The embodiment of the invention disclosed in Figure 13 is identical to that of Figures 7 and 8 except that no scale, dial or sliding is included so that its function is similar to that shown in Figures 1 and 2.

The respective methods of setting the various scales in connection with each of the various embodiments having been described, the use of any of these forms of the invention with picture models will now be described.

The pairs of stereo photographs are positioned on a mounting board or a flat-top table in the usual manner and the photo base determined to form a picture model. It is important that the pair of prints be positioned with the photo base flight lines in the same vertical plane (photo centers and conjugate centers exactly in a straight line) and the images on the pair of prints the correct distance apart, depending upon the eye base measurement of the operator.

Assuming that differences in elevation are to be determined from a picture model in which the flight altitude of the plane above the ground was 16,300 feet, this altitude is set on the dial scales of Figures 4 and 7 by using the indicia arrow 48 to interpolate 300 feet between the 16,000 and 17,000 indicia lines. On the sliding scale of Figure 5 the cross mark adjacent the 16 is selected and the vernier is moved to 3. In the model shown in Figures 1 and 13 the inclination of the legs 16 and 17 is set from precalculated tables which include therein the photo base calculations.

The photo base settings are next made and this corresponds to the average photo base value determined for the pair of prints. In the dial scale models, the peripheral altitude settings being fixed by use of the clamping screw 49, the legs of the meter are adjusted to vary the angle of inclination until the cross mark 45 coincides with the photo base number upon which the thumb screw 19 is tightened. In the case of the sliding scale of Figure 5, the vernier V having been set to 300, the legs 16 and 17 are moved relatively to vary the wedge angle until the cross mark associated with the number 16 in the A scale coincides with the proper photo base number upon which the thumb screw 19 is tightened. It is preferable to use a magnifying glass for making the latter setting which should be interpolated to 1/10 of an inch of photo base distance and the setting checked thereafter. The accuracy of the elevational difference determination is mainly dependent on the precision of these settings.

The stereo coverage area of the pair of prints should be carefully studied and a point selected that appears to be at approximately the lowest ground elevation in the area. Any of the above forms of the stero elevation meter having been set as described above to an elevation of 16,300 feet and the proper photo base may now be placed on the picture model in such a position that the 0—0 dots of the two rows 40 are approximately over the lowest point selected by scanning the prints, the two rows of dots being pointed directly away from the operator.

The two rows of dots 40 are now spread by turning the operating screw 39 of Figures 1 to 6 and 13 or operating screw 67 of Figures 7 and 8 until the 0—0 fused dot rests on the ground at the point of lowest elevation. This adjustment spreads or retracts the two rows of dots 40 in exact parallelism with respect to any photo base adjustment and the stereo elevation meter is now ready for use on the picture model. The stereoscope should always be placed so that the lens are approximately centered over the points on which height readings are to be taken.

The meter should be properly oriented over one of two points whose elevation difference is to be determined and the meter moved toward or away from the operator until one of the fused dots rests at the elevation of the first point. The next lower dot should be beneath and the next higher dot above this point. The meter should be properly oriented over the selected point by slightly twisting it until the two rows of dots 40 are clearly and sharply fused coincident with clear stereo fusion of the picture model and the large "target dots" should be checked to see that they are also fused so that there is no possibility of "jumping" of the small dots, that is, the 50 foot dot on one row erroneously fused with the 45 foot dot on the other row. It will be readily apparent that if the reading at the first point is 120 and the reading at the second point is 175, the elevation difference between the two points is 55 feet.

The instrument can be used in either of two orientations. The row of fused dots may slope towards the observer or they may slope away from the observer. Greater accuracy may be possible by reading each point both ways and the two readings averaged. If the general slope of the ground is toward or away from the observer it is usually helpful to have the row of dots slope in the opposite direction.

The rows of dots on the scales are arranged so that the intervals between successive dots give an elevation difference of five feet. When using photographs which have a flying height of from 6,000 to 14,000 feet a greater degree of accuracy may be had by interpolating between dots. This may be accomplished only with photographs taken at lower altitudes since parallaxes for five-foot difference in elevation are very small on photographs taken at higher altitudes. With sufficient practice the operator should soon learn to interpolate properly, and the conditions under which interpolation is feasible. When elevation differences are being measured on photographs which have been flown at altitudes ranging from 6,000 to 10,000 feet care should be taken to use only the lower half of the scale; that is, that half of the scale giving elevation differences from 0 to 400 feet. This limitation is necessary because the curvature of the 400 to 800 foot section of the parallax curve does not agree closely enough with the 0 to 400 foot section to permit the full 800 foot range to be used on photographs taken at altitudes of less than 10,000 feet above the ground.

The entire range of 800 feet may be used on stereo photographs taking in altitudes between 10,000 and 24,000 feet as to the embodiment disclosed in Figure 5 and up to 60,000 feet in the case of the dial scales. It will be appreciated that the range of the instrument can be repeatedly extended by measuring altitude differences between a low point in a picture model to a point near the top of the range and then reducing the altitude setting by either 400 or 800 feet, as the case may be, adjusting the measured photo base to conform to the reduced flight altitude, and resetting the adjustment of the instrument for a new range above the point near the top of the first range which thus serves as a sort of bench mark. Successive range extensions can be accomplished in a similar manner but the originally measured photo base must be recalculated for a range extension. The formula is:

New photo base =
$$\frac{PB \text{ (orig.)} \times \text{orig. flight alt.}}{\text{Orig. F alt.} - \text{Range (either 400 or 800)}}$$

It will now be readily apparent that the various forms of the invention comprise simple, accurate and convenient means with respect to parallax wedges for varying the angle and lateral distance between the rows of dots for various photo bases and a great range of flying heights.

The meter of Figure 7 is somewhat simpler than that of Figures 3–6 in having only one spreadable transparent plate 25 but for the same reason, the latter does not have as great a scope and generally may not be used with enlargements of the 9" x 9" contact prints which afford better definitions of the detail, as may the embodiments of Figures 3–6. The latter may also be used with a mirror type stereoscope which permits pictures to be mounted far enough apart so that the prints will not overlap when mounted for use.

The parallel spreader feature enables the operator to rest the zero dot on a first point so that successive readings on other points will each give the elevation difference without subtraction. It will be appreciated that the calibration feature and the means for correcting errors in calibration (which is adaptable to all forms) greatly enhance the utility and practicability of the meter.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A variable elevation wedge for determining the difference in elevation between points on aerial photographs comprising a pair of legs pivotally connected at one of their ends, a transparent plate mounted on each of said legs and including a like row of elevation marks, indicia along a row of said elevation marks comprising a scale corresponding to elevations, and means for clamping said legs at any wedge angle.

2. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, and means operative to vary the lateral distance between said rows of elevation marks without unclamping said legs.

3. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, and means operative to vary the lateral distance between said rows of elevation marks without unclamping said legs, said last mentioned means including pivotal connections between one of said legs and its plate, and linkage means operable to swing said plate toward and away from said leg.

4. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, reference marks formed on said legs, and a movable scale inclding altitude and photo base markings mounted on said legs for cooperation with said reference marks to set the wedge angle for a given altitude and photo base.

5. A variable elevation wedge for determining the difference in elevation between points on aerial photographs comprising a pair of pivotally conected legs, a transparent plate mounted on each of said legs and including a like row of elevation marks, indicia along a row of said elevation marks comprising a scale corresponding to elevations, means for clamping said legs at any wedge angle, reference marks formed on said legs, and a movable scale including altitude and photo base markings mounted on said legs for cooperation with said reference marks to set the wedge angle for a given altitude and photo base and means operative to vary the lateral distance between said rows of elevation marks without unclamping said legs.

6. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, a cross mark formed on one of said legs and a reference mark formed on the other, and a dial scale including a peripheral altitude scale and photo base scale curves pivoted on said other leg for cooperation respectively with said reference and said cross mark to set the wedge angle for a given altitude and photo base.

7. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, a cross mark formed on one of said legs and a reference mark formed on the other, and a dial scale including a peripheral altitude scale and photo base scale curves pivoted on said other leg for cooperation respectively with said reference and said cross mark to set the wedge angle for a given altitude and photo base, and means operative to vary the lateral distance between said rows of elevation marks.

8. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, an altitude vernier and a photo base scale mounted on one of said legs, and an altitude scale slidably mounted in the other of said legs for adjustment with respect to said vernier and cooperation with said photo base scale upon pivotal movement of said legs to set the wedge angle therebetween for a given altitude and photo base.

9. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, an altitude vernier and a photo base scale mounted on one of said legs, and an altitude scale slidably mounted in the other of said legs for adjustment with respect to said vernier and cooperation with said photo base scale upon pivotal movement of said legs to set the wedge angle therebetween for a given altitude and photo base, and means operative to vary the lateral distance between said rows of elevation marks.

10. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, a cross mark formed on one of said legs and a reference mark formed on the other, and a dial scale including a peripheral altitude scale and photo base scale curves pivoted on said other leg for cooperation respectively with said reference and said cross mark to set the wedge angle for a given altitude and photo base, and means on said dial scale for calibrating it with respect to said cross-mark.

11. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, a cross mark formed on one of said legs and a reference mark formed on the other, and a dial scale including a peripheral altitude scale and photo base scale curves pivoted on said other leg for cooperation respectively with said reference and said cross mark to set the wedge angle for a given altitude and photo base, and means on said dial scale for calibrating it with respect to said cross mark, the position of said cross mark being adjustable with respect to the dial scale.

12. A variable elevation wedge for determining the difference in elevation between points on aerial photographs comprising a pair of pivotally connected legs, a transparent plate mounted on each of said legs and including a like row of elevation marks, indicia along a row of said elevation marks comprising a scale corresponding to elevations, means for clamping said legs at any wedge angle, a cross mark formed on one of said legs and a reference mark formed on the other, and a dial scale including a peripheral altitude scale and photo base scale curves pivoted on said other leg for cooperation respectively with said reference and said cross mark to set the wedge angle for a given altitude and photo base, means on said dial scale for calibrating it with respect to said cross mark, and means for rectifying any error in calibration.

13. A variable elevation wedge for determining the difference in elevation between points on aerial photographs comprising a pair of pivotally connected legs, means for clamping said legs at any wedge angle, a pair of transparent plates each including a like row of elevation marks, indicia along a row of said elevation marks comprising a scale corresponding to elevations, a parallelogram linkage connecting one of said plates in abutting relation to the outer edge of each of said legs, and an operating screw mounted on said legs and connected to said plates through said linkage and effective to move said plates outwardly to separate said rows of elevation marks while maintaining said plates parallel to the adjacent legs.

14. A variable elevation wedge for determining the difference in elevation between points on aerial photographs comprising a pair of pivotally connected legs, means for clamping said legs at any wedge angle, a pair of transparent plates each including a like row of elevation marks, indicia along a row of said elevation marks comprising a scale corresponding to elevations, a parallelogram linkage connecting one of said plates in abutting relation to the outer edge of each of said legs, an operating screw mounted on said legs and connected to said plates through said linkage and effective to move said plates outwardly to separate said rows of elevation marks while maintaining said plates parallel to the adjacent legs, and spring means cooperating with said linkage to return said plates against said legs.

15. A variable elevation wedge for determining the difference in elevation between points on aerial photographs comprising a pair of pivotally connected legs, means for clamping said legs at any wedge angle, a pair of transparent plates each including a like row of elevation marks, indicia along a row of said elevation marks comprising a scale corresponding to elevations, a parallelogram linkage connecting one of said plates in abutting relation to the outer edge of each of said legs, and an operating screw mounted on said legs and connected to said plates through said linkage and effective to move said plates outwardly to separate said rows of elevation marks while maintaining said plates parallel to the adjacent legs, a cross mark formed on one of said legs and a reference mark formed on the other, and a dial scale including a peripheral altitude scale and photo base scale curves pivoted on said other leg for cooperation respectively with said reference and said cross mark to set the wedge angle for a given altitude and photo base.

16. A variable elevation wedge for determining the difference in elevation between points on aerial photographs comprising a pair of pivotally connected legs, means for clamping said legs at any wedge angle, a pair of transparent plates each including a like row of elevation marks, indicia along a row of said elevation marks comprising a scale corresponding to elevations, a parallelogram linkage connecting one of said plates in abutting relation to the outer edge of each of said legs, and an operating screw mounted on said legs and connected to said plates through said linkage and effective to move said plates outwardly to separate said rows of elevation marks while maintaining said plates parallel to the adjacent legs, a cross mark formed on one of said legs and a reference mark formed on the other, and a dial scale including a peripheral altitude scale and photo base scale curves pivoted on said other leg for cooperation respectively with said reference and said cross mark to set the wedge angle for a given altitude and photo base, and means on said dial scale for calibrating it with respect to said cross mark.

17. A variable elevation wedge for determining the difference in elevation between points on aerial photographs comprising a pair of pivotally connected legs, means for clamping said legs at any wedge angle, a pair of transparent plates each including a like row of elevation marks, indicia along a row of said elevation marks comprising a scale corresponding to elevations, a parallelogram linkage connecting one of said plates in abutting relation to the outer edge of each of said legs, and an operating screw mounted on said legs and connected to said plates through said linkage and effective to move said plates outwardly to separate said rows of elevation marks while maintaining said plates parallel to the adjacent legs, an altitude vernier and a photo base scale mounted on one of said legs, and an altitude scale slidably mounted in the other of said legs for adjustment with respect to said vernier and cooperation with said photo base scale upon pivotal movement of said legs to set the wedge angle therebetween for a given altitude and photo base.

18. A variable elevation wedge for determining the difference in elevation between points on aerial photographs comprising a pair of pivotally connected legs, means for clamping said legs at any wedge angle, one of said legs comprising a transparent plate including a row of elevation marks and indicia along said row comprising a scale corresponding to elevations, a similar plate arranged adjacent and parallel to the other of said legs, means pivotally connecting said similar plate to said other leg for movement toward and away therefrom to vary the lateral distance between said rows of elevation marks, and an operating screw connected to said connecting means to effect said movement.

19. A variable elevation wedge for determining the difference in elevation between points on aerial photographs comprising a pair of pivotally connected legs, means for clamping said legs at any wedge angle, one of said legs comprising a transparent plate including a row of elevation marks and indicia along said row comprising a scale corresponding to elevations, a similar plate arranged adjacent and parallel to the other of said legs, means pivotally connecting said similar plate to said other leg for movement toward and away therefrom to vary the lateral distance between said rows of elevation marks, and an operating screw connected to said connecting means to effect said movement, a cross mark formed on one of said legs and a reference mark formed on the other, and a dial scale including a peripheral altitude scale and photo base scale curves pivoted on said other leg for cooperation respectively with said reference and said cross mark to set the wedge angle for a given altitude and photo base.

References Cited in the file of this patent
UNITED STATES PATENTS

| | | |
|---|---|---|
| 2,428,435 | Schlatter | Oct. 7, 1947 |
| 2,569,498 | Schlatter | Oct. 2, 1951 |